United States Patent
El-Shoubary et al.

(10) Patent No.: US 6,646,037 B1
(45) Date of Patent: Nov. 11, 2003

(54) PIGMENTS TREATED WITH ORGANOSULFONIC COMPOUNDS

(75) Inventors: Modasser El-Shoubary, Crofton, MD (US); Robert Kostelnik, Ellicott City, MD (US); Charles Wheddon, Tetney near Grimsby (GB)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 10/209,128

(22) Filed: Jul. 31, 2002

(51) Int. Cl.⁷ .............................. C08K 3/10; C08K 3/34
(52) U.S. Cl. .................. 524/413; 524/430; 524/447; 524/449; 524/451; 524/492; 523/200; 252/400.62; 252/401; 252/402; 252/403; 106/417; 106/493; 106/500
(58) Field of Search ........................... 252/400.62, 401, 252/402, 403; 523/200; 524/413, 430, 447, 449, 451, 492; 106/417, 493, 500

(56) References Cited

U.S. PATENT DOCUMENTS

| | | | |
|---|---|---|---|
| 4,307,009 A | 12/1981 | Lüders et al. | |
| 5,260,353 A | 11/1993 | Palmer et al. | ............. 523/200 |
| 5,362,770 A | 11/1994 | Palmer et al. | ............. 523/200 |

*Primary Examiner*—Kriellion A. Sanders
(74) *Attorney, Agent, or Firm*—Kalow & Springut LLP; Scott D. Locke, Esq.

(57) ABSTRACT

A treatment for pigments is provided. This treatment, which uses certain organosulfonic compounds, imparts improved physical and chemical qualities including lacing resistance, improved dispersion and decreased chemical reactivity when these treated pigments are incorporated into polymeric matrices. The addition of organosulfonic compounds may flexibly be incorporated into known processes at varying points, and are preferably added downstream of any filtering steps.

20 Claims, No Drawings

PIGMENTS TREATED WITH ORGANOSULFONIC COMPOUNDS

FIELD OF THE INVENTION

The present invention relates to pigments, and in particular, pigments that have been treated with certain organosulfonic compounds, such as organosulfonic acids and their salts.

BACKGROUND OF THE INVENTION

The incorporation of pigments into polymer matrices has been performed for many years, and over the years, pigments have been and continue to be incorporated into polymer matrices for many reasons. For example, pigments may be used as fillers. They may also be used to impart better physical and chemical attributes to polymer matrices, including decreased chemical activity and improved thermal stability, especially lacing resistance in extruded polymer film applications. In order to obtain different benefits, pigments may be treated in different ways, including by adding surface treatments.

Commonly used pigments for incorporation into polymer matrices include titanium dioxide and kaolin. Commonly known surface treatments that have been applied to these pigments include silanes, alkanolamines, polyols, alkylphosphonic acids and phosphorylated polyenes. The optimal treatment will in part depend on the attributes that one wants in a treated pigment, which will in part depend on the application in which it will be used. Often one wants to provide a hydrophobic pigment that is stable, easy to prepare, cost effective, able to be dispersed to a high degree in polymers, and not reactive in the presence of other additives such as lithopone. However, despite the numerous known surface treatments, for various reasons, including cost and desired properties, no known surface treatments are ideal for all applications. Thus, there is always a need to develop new and better treatments for pigments.

One under-explored option for treating pigments is the use of organosulfonic compounds such as organosulfonic acids and their salts. These compounds have been suggested as treatments for calcium carbonate in order to improve flow properties of molding compositions and the mechanical properties of shaped articles made from molding compositions. However, such limited use has not been extended to other applications, such as metal oxides and their masterbatches in polymers such as polyethylene, or articles made therefrom.

Organosulfonic compounds have also been suggested as surfactants that may be used with pigments by bonding to the pigments through metal cations. For example, U.S. Pat. No. 5,260,353 teaches using hydrolyzed metal cations to bond surfactant species chemically to particulate surfaces with a requirement of the addition of a surfactant treatment in a slurry within a specified pH range that is dependant on the metal cation. By operating at a particular acidic pH, this prior art method uses metal ions to activate particulate surfaces and to permit chemical bonding of a surfactant to the surface at the activated metal site. Under this method, it is suggested that a surfactant is firmly bonded to the substrate surface. Because of the specific conditions under which this process must be practiced, it may be undesirably cumbersome to control if one wants to ensure minimal loss of the surface treatment.

Surprisingly, it was found that a hydrophilic pigment that comprises a pigmentary base with an organosulfonic compound that is not tightly bound, but that has good dispersiblity could be produced. The present invention provides economical and easily prepared novel pigments that have excellent dispersion in polymer concentrates comprising up to 85% of the treated $TiO_2$ based upon the weight of the polymer matrix and provide excellent resistance to lacing when processed into thin films such as polyethylene films at high temperatures. The present invention also provides methods for making these pigments. Pigments produced according to the present invention may be incorporated into a polymer matrix that may be an end-product in and of itself or a product that will be further processed such as in a masterbatch that can be let down into a polymeric film.

SUMMARY OF THE INVENTION

The present invention provides treated pigments for use in polymer matrices, as well as methods for making these pigments. The treated pigments may comprise a pigmentary base that is treated with one or more organosulfonic compounds. Optionally, these pigments will further comprise a metal oxide. The treated pigments may be formed by treating a pigmentary base with an organosulfonic acid or a salt of an organosulfonic acid that may be represented by the following formula:

$(R-SO_3)_x M^{x+}$ wherein x=1, 2, 3, or 4
  M is a hydrogen, ammonium, organoammonium or metal ion with a valence of +1, +2, +3 or +4; and R is an organic group having from 2 to 22 carbon atoms.

According to one embodiment, the present invention provides a pigment comprising:
  a. a pigmentary base; and
  b. an organosulfonic compound having the formula:

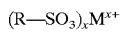
$(R-SO_3)_x M^{x+}$ wherein x=1, 2, 3 or 4
  M is a hydrogen, ammonium, organoammonium or metal ion with a valence of +1, +2, +3 or +4 and R is an organic group having from 2 to 22 carbon atoms.

The treated pigments of the present invention may be combined with and readily dispersed into polymers to form polymer matrices after the pigmentary base has been combined with the organosulfonic compound. The pigments of the present invention, which have been treated with organosulfonic compounds, exhibit excellent lacing resistance when incorporated into polymeric articles such as films. Additionally, the present invention also provides a pigment that does not generate noxious odors when mixed with lithopone at high temperatures.

According to one preferred method for making the pigments of the present invention, a pigmentary base is combined with an organosulfonic compound of Formula I in an environment that has a pH of greater than or equal to about pH 6 prior to addition of the organosulfonic compound. It is also preferable that the pH after the addition of the organosulfonic compound is greater than or equal to about pH6. Further, these substances are preferably combined downstream of any filtering action.

The treated pigments of the present invention may also be used to prepare highly loaded polymer masterbatches. The treated pigments exhibit excellent dispersion qualities when incorporated into masterbatches containing up to about 85% of the pigments treated with organosulfonic compounds. These highly loaded masterbatches are especially useful in applications in which dispersion and thermal stability, especially resistance to lacing, are critical.

The treated pigments of the present invention have the advantages of being stable, easy to prepare, able to be dispersed to a high degree in polymers and unreactive in the presence of other additives such as lithopone. Such treated pigments may be useful in the manufacture of plastics and other products.

DETAILED DESCRIPTION OF THE INVENTION

The present invention provides pigments for use in connection with polymers and the methods for making these pigments. According to the present invention, a pigmentary base is treated with an organosulfonic compound. The resulting treated pigment may then be combined with a polymer to form a polymer matrix.

The present disclosure is not intended to be a treatise on either pigments or the production of polymer matrices and readers are referred to appropriate, available texts and other materials in the field for additional and detailed information on any aspect of practicing this invention.

The treated pigments made according to present invention comprise a pigmentary base that is treated with an organosulfonic compound. Preferably, the pigment further comprises a metal oxide such as aluminum oxide. Suitable pigmentary bases for use in the present invention include titanium dioxide, kaolin, talc and mica. The phrase "pigmentary base" as used herein refers to the pigment that has not been treated with an organosulfonic compound. Preferably, titanium dioxide is the chosen pigmentary base. When the pigmentary base is titanium dioxide, the titanium dioxide may be either rutile, produced by either the sulfate or chloride process, or anatase, produced by the sulfate process. The processes for making rutile and anatase pigments are well known to persons skilled in the art.

The organosulfonic compounds of the present invention may have hydrocarbon groups from about 2 to about 22 carbon atoms. Some examples of hydrocarbon groups useful in the present invention include, ethyl-, propyl-, butyl-, isobutyl-, tertiary butyl-, pentyl-, hexyl-, heptyl-, octyl-, 2-ethyhexyl-, decyl-, dodecyl- and the like. Preferably, the hydrocarbon group is a linear hexyl-, a linear octyl- or 2-ethylhexyl-.

In order to prepare the treated pigment of the present invention, the pigmentary base is treated with an organosulfonic compound that may in general be represented by Formula I, which includes not only organosulfonic acids, but also their salts. These organosulfonic compounds of Formula I may be synthesized de novo or obtained from commercial sources such as Aldrich Chemical and Sanwa Chemical. The phrase "organosulfonic compound" refers to organosulfonic acids and the salts of organosulfonic acids. For compounds that may be represented by Formula I, preferably R will be hexyl-, octyl- or 2-ethyhexyl-. Formula I is:

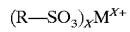
$(R-SO_3)_x M^{x+}$ where R represents a saturated, unsaturated, branched, linear or cyclic organic group having from 2 to 22 carbon atoms; X equals 1, 2, 3 or 4; and M represents hydrogen, a metal ion, ammonium ion or organoammonium ion such as protonated triethanolamine. Preferably, if M is a metal ion, it is a metal ion with a valence of +1, +2, +3 or +4 such as $Na^{1+}$, $Ca^{2+}$, $Mg^{2+}$, $Al^{3+}$ or $Ti^{4+}$.

The above described organosulfonic compounds, which form the surface treatment of the present invention, will be used to treat the pigmentary base to form a treated pigment. The phrase "treated pigment" refers to any pigmentary base that has been surface treated or modified. The phrase "organosulfonic treated pigment" refers to a pigmentary base that has been treated with any substance that may be represented by the above Formula I. The amount of organosulfonic compound used to treat the pigmentary base is preferably from about 0.1 percent to about 5 percent by weight, based on the weight of the pigmentary base; more preferably from about 0.3 percent to about 2.0 percent; and most preferably from about 0.7 percent to about 1.2 percent.

The organosulfonic compound may be combined with the pigmentary base at any one of a number of stages of production. One of the reasons that the organosulfonic compound may be incorporated into any one of a number of the production steps of the chloride and/or sulfate processes is that it is thought that there are no byproducts of the interaction of the organosulfonic compound and the pigment's surface, or at the most, water or a salt may be the byproducts, both of which are easily removed.

Preferably, the combining of the pigmentary base and the surface treatment of the invention will occur at a temperature of from about 10° C. to about 270° C. The optimal temperature at which the pigmentary base and the surface treatment are combined is dependent on the step in the pigment production process in which the surface treatment is added.

The organosulfonic compounds are preferably combined with the pigmentary base while the pigmentary base is at a pH of greater than or equal to pH 6. More preferably, the pH is between about pH 6.5 and about pH 7.5. Preferably, the metals will be present in their oxide form, and most preferably, aluminum oxide will be present at the time that the organosulfonic compound is being added. Preferably between about 0.2 wt % and 1.2 wt % alumina will be used based on the weight of the pigment. The use of alumina in the production of pigments is well known to persons skilled in the art.

Under these conditions, the pigmentary base may be referred to as "an unactivated pigmentary base," in order to distinguish from circumstances in which a metal such as aluminum is present in its ionic form and activates the pigmentary base. During preparatory processes such as the production of $TiO_2$, these pH values under which "unactivated pigmentary base" exists may, for example, be found when a filter cake has been formed, or after the organosulfonic compound has been added to the pigment. Additions at these points are particularly beneficial because under standard processing no subsequent filtering is performed; consequently, organosulfonic compounds will not be removed and the process may be performed economically.

The methods for adding the organosulfonic compound may be similar to methods for adding other surface treatments that are flexibly and easily incorporated into pigment production processes. There are many places during production of a pigment in which the organosulfonic compound may be added and the points of additions described herein are not meant to be exhaustive. The optimal point during which to add the organosulfonic compound will in part depend on the process in which it is to be incorporated.

In the simplest of methods, the organosulfonic compound may be added by spraying or pouring into a system in which the pigmentary base is already present. To maximize the distribution of the organosulfonic compound, one may wish to mix or to stir the organosulfonic compound and the pigmentary base. Methods for mixing a treatment and a pigmentary base are well known to persons skilled in the art. Devices such as a V-shell blender equipped with an intensifier bar for application of a liquid to a powder or other suitable mixing devices now known or that come to be known to those skilled in the art may be used.

Alternatively, the organosulfonic compound may be metered into a micronizer along with the pigment powder to be ground. Air or steam micronization techniques may be used at temperatures from room temperature up to 250° C. or higher as is known or easily knowable to persons skilled in the art.

In the conventional production process, the organosulfonic compound may, by way of further example, be added at the spray dry feeder, to a high intensity milling device or to a micronizer feed prior to or concurrent with micronization. As described above, it is not as effective to add the organosulfonic compound to a pigment slurry prior to filtration and washing since a portion of the organosulfonic compound will be lost upon washing of the pigment. By contrast, adding the organosulfonic compounds of the present invention to the filter cake or micronizer feed minimizes the loss of the organic portion, thereby improving manufacturing efficiency. It is desirable to add the organosulfonic compound to a fluidized, washed filter cake with agitation in order to assure uniform mixing of the organosulfonic compound among the pigment particles. Thus, in some embodiments, it is desirable to add the organosulfonic compound after any filtration and washing stages, but prior to any drying stage.

If the organosulfonic compound is added to a dry pigment such as a spray drier product or micronizer feed, particular care must be taken to ensure uniform mixing of the organosulfonic compound with the pigment powder. This may, for example, be accomplished by using a V-shell blender equipped with an intensifier bar for application of the organic as a neat liquid or solution or other suitable mixing devices. If the organosulfonic acid compound is a solid material, then dissolving in water, ethanol, tetrahydrofuran or any suitable solvent will aid in uniform application of the organosulfonic acid compound to the pigmentary base.

If the organosulfonic compound is a solid substance, it may be dissolved in any appropriate solvent, such as water, alcohol, tetrahydrofuran, etc., before being added to the pigmentary base. By dissolving the solid substance in a solvent, uniform mixing is more easily obtained. For example, when the organosulfonic compound is dissolved in an appropriate solvent, it may be added after the pigmentary base is dried, prior to entry into a micronizer.

After the organosulfonic compound has been combined with the pigmentary base, the treated pigment may be fluid energy milled using steam or air to produce finished pigments that retain high levels of the organosulfonic compound. When a treatment is added after all filtering steps, the amount of the treatment that remains associated with the pigment is much greater than if there were a filtration step after addition of the surface treatment. This would reduce the overall cost of producing the treated pigment.

When, for example, the pigment is titanium dioxide, the organosulfonic acid compound may be added to the untreated titanium dioxide directly obtained from a production process such as the chloride or sulfate processes. Alternatively, the pigmentary base titanium dioxide may be further treated with additional metal oxides, such as aluminum oxide, silicon dioxide, zirconium oxide and the like, using any process known to those skilled in the art, prior to treatment with the organosulfonic compound of the present invention. Other examples of treatments include phosphates and tin. Additionally, the untreated pigmentary base or the treated pigment may be secondarily treated with polyalcohols such as trimethylolethane and trimethylolpropane or alkanolamines such as triethanolamine prior to addition of the organosulfonic compound or may be added subsequent to addition of the organosulfonic compound. One may also choose to treat with inorganic phosphates or combinations of inorganic phosphates and metal oxides. Further, one may choose to treat with combinations or mixtures of the aforementioned compounds. When the pigmentary base is titanium dioxide, the pigments that have been treated with an organosulfonic compound may be fluid energy milled using steam or air to produce finished pigments that retain high levels of the organosulfonic compound thereby reducing the overall cost of producing modified $TiO_2$.

Once the organosulfonic treated pigment is formed, it may then be combined with a polymer to form a polymer matrix. The phrase "polymer matrix" refers to the substance comprising the polymer and the treated pigment. Polymers that may be of use in the present invention include but are not limited to polymers of unsubstituted ethylene monomers, including polyethylene, polypropylene, polybutylene, and copolymers of ethylene with alpha-olefins containing 4 to 12 carbon atoms or vinyl acetate; vinyl homopolymers, acrylic homopolymers and copolymers, polyamides, polycarbonates, polystyrene, acrylonitrile-butadiene-styrenes and polyethers. Other suitable polymer types also include polyvinylchloride, polyurethanes, polysulfones, polyimides, polyesters and chlorinated polyesters, polyoxyethylenes, phenolics, alkyds, amino resins, epoxy resins, phenoxy resins and acetal resins. Methods for combining treated Pigments with polymers are well known to persons skilled in the art.

The treated pigment may be combined with the polymer and have a loading of up to about 85% by weight, based on the weight of the polymer matrix. Preferably, a loading of treated pigment of about 50% to about 85% by weight based on the weight of the polymer matrix is used. This loading may be used as a masterbatch. A "masterbatch" is meant to refer to a mixture of two or more substances that are blended together and then blended with one or more other ingredients that may be the same or different as either of the first two substances. The methods for creating a masterbatch with the treated pigment are known or easily known to persons skilled in the art. For example, the masterbatch may be created by combining the treated pigment and the polymer using a BR Banbury Mixer.

It has been found, surprisingly and unexpectedly, that the treated pigments of this invention do not generate potentially hazardous or noxious gases when used in combination with the polymer filler lithopone, which contains combinations of zinc sulfide and barium sulfate. By contrast, when one uses phosphorylated polyenes in combination with lithopone a potentially hazardous gas is emitted.

It has also been found, surprisingly and unexpectedly, that the treated pigments of this invention impart good lacing resistance to polymers into which they are incorporated. Lacing, which is believed to be a measure of volatility at a specific weight percent pigment loadings and processing temperatures, may manifest as a void or hole in a plastic film.

Further, it has been found surprisingly and unexpectedly that pigments made according to the present invention exhibit excellent dispersion when incorporated into polymeric film articles.

EXAMPLES

The following examples set forth preferred embodiments of the invention. These embodiments are merely illustrative and are not intended and should not be construed to limit the claimed invention in any way.

DETERMINATION OF DISPERSION AND LACING PERFORMANCE

Lacing Evaluations

The high temperature stability of polymers containing pigments is an important property of commercial polymer films, especially polyethylene film applications. Voiding or "lacing" accompanies the failure of films. Lacing is believed to be a measure of volatility at specific weight percent pigment loadings and processing temperatures.

For the present invention, lacing tests were conducted on 50% $TiO_2$ concentrate samples prepared using a Haake Rheocord 9000 Computer Controlled Torque Rheometer. Thus, 125 g of $TiO_2$ and 125 g of LDPE 722 manufactured by Dow Chemical Company were dry blended and added to the 75° C. preheated chamber with rotors running at 50 rpm. One minute after addition of the $TiO_2$/LDPE mixture, the chamber temperature was raised to 105° C. Frictional heat generated by the mixing process was allowed to drive the rate of incorporation of the $TiO_2$ into the LDPE until a steady state mixture was achieved. The concentrate was removed from the mixing chamber and placed into a Cumberland Crusher to obtain finely granulated 50% concentrate samples. The granulated concentrates were conditioned for 48 hours at 23° C. and 50% relative humidity. These concentrates were then let down into Dow Chemical 722 LDPE to achieve a 20% loading of $TiO_2$ in the final film.

Lacing evaluations were run on a 1" extruder equipped with a cast film slot die. A temperature profile of 625° F. die, 515° F. clamp ring, 415° F. zone 3, 350° F. zone 2, and 300° F. zone 1 was used. The screw speed was set at about 90 rpm. A 25.4 cm polished chrome chill roll, set in conjunction with the extruder was used to maintain a 75-μm-film thickness, and to cool and transport the films. The chill roll distance from the die lips was about 22 mm and the temperature was about 27° C.

After the $TiO_2$/LDPE mix was placed in the hopper, the material was allowed to purge until the appearance of a white tint in the film was first noted. To ensure the concentration of $TiO_2$ in the film had stabilized, a time interval of two minutes was allowed before lacing observations were recorded and a film sample obtained. The extruder was then purged with LDPE until the film turned clear. Lacing performance was determined by counting the relative size and number of holes generated in a film sample laid out on a dark surface. A 1.0–3.0 rating system was used. A rating of 1 was given to films with no lacing, 2 was given to films showing the onset of lacing and 3 was given to films with extreme lacing. Increments of 0.1 were used to give an indication of the relative performance between the samples.

Dispersion Testing

Using a small-scale laboratory extrusion apparatus, a measure of pigment dispersion into organic polymers was obtained by measuring the relative amount of pigment trapped onto screens of extruder screen packs. Tests were made using 75% $TiO_2$ concentrates in low density polyethylene prepared using a Haake 3000 Rheomix mixer. The mixer was controlled and monitored with a Haake 9000 Rheocord Torque Rheometer. 337.7 grams of micronized $TiO_2$ and 112.6 grams of NA209 LDPE manufactured by Equistar were dry blended and added to the 75° C. mixing chamber with rotors operating at 50 rpm. The mixer temperature was programmed to increase to 120° C. one minute after the dry blend was introduced to the mixing chamber. After a steady state mixture was achieved, the compound was mixed for an additional 3 minutes. The compound was removed from the chamber and granulated using a Cumberland crusher.

Dispersion tests were conducted using a Killion single screw extruder, model KL-100 equipped with a 20:1 length to diameter screw. The extruder was preheated at 330, 350, 390 and 380° F. from zone 1 to the die, respectively, and operated at 70 rpm. A purge of 1000 grams of NA952 LDPE manufactured by Equistar was run through the system, and a new screen pack was installed. The screen pack consisted of 40/500/200/100 mesh screens from the die towards the extruder throat. After temperature stabilization, 133.33 grams of granulated 75% $TiO_2$ concentrate was fed into the extruder. This was followed with 1500 grams of NA952 purge as the feed hopper emptied. After the LDPE purge was extruded, the screens were removed, separated and tested using a relative count technique from the measurements from an X-ray fluorescence spectrometer. The number of $TiO_2$ counts per second was obtained for the 100, 200 and 500 mesh screens in the pack and totaled to obtain the dispersion result. A count result of less than 5000 is considered to represent excellent dispersion.

Example 1

In this example, 0.90% of the sodium salt of octylsulfonic acid is added to dry chloride process rutile $TiO_2$ base, which was coated with 0.20% alumina.

25.9 ml of a 386.4 grams $Al_2O_3$/liter solution of sodium aluminate were added to 5000 grams of fine particle chloride process $TiO_2$ in a 350 grams/liter slurry with mixing at 70° C. The slurry pH was adjusted to 7.0 using a 50% sodium hydroxide solution, and the slurry was allowed to age for 30 minutes with stirring. The aged slurry was filtered and washed three times with 5000 ml aliquots of 80° C. deionized water, and then dried overnight at 115° C. in an oven. The dried filter cake was forced through an 8-mesh screen in preparation for treatment with the sodium salt of octylsulfonic acid.

9.0 grams of the sodium salt of octylsulfonic acid (Aldrich Chemical) as a solution in tetrahydrofuran were added drop wise in a circular motion to 1000 grams of the dry, 8 meshed, alumina coated $TiO_2$, which was spread to a 1 cm thickness on polyethylene film. The pigment was mixed with a large spatula and transferred to a one gallon wide-mouthed Nalgene bottle. The bottle containing pigment-was rolled for 10 minutes on a roller mill. The rolled pigment was steam micronized to produce the finished pigment.

The finished pigment was incorporated into 75% and 50% $TiO_2$ containing low-density polyethylene masterbatches for dispersion and lacing evaluations. Results are given in Table 1.

Example 2

In this example, 1.1% of the sodium salt of octylsulfonic acid was added to dry chloride process rutile $TiO_2$ base, which is coated with 0.20% alumina.

11.0 grams of the sodium salt of octylsulfonic acid (Aldrich Chemical) as a 23% solution in tetrahydrofuran were added drop wise in a circular motion to 1000 grams of dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatches for dispersion and lacing evaluations. Results are given in Table 1.

Example 3

In this example, 1.1% of octylsulfonic acid (acid form) was added to a washed filter cake of chloride process rutile $TiO_2$ base, which was coated with 0.20% alumina.

A column of Dowex 50W-X8 strong acid ion exchange resin that was previously rinsed with 2 M sulfuric acid was rinsed with deionized water to remove excess rinse acid. Rinsing continued until the column eluent returned to neutral pH. Excess water was drained from the column until the level of the liquid was at the level of the resin.

20 grams of the sodium salt of 1-octane sulfonic acid was dissolved in 100 ml of deionized water and added to the ion exchange column. The column eluent was drained to waste until the pH turned acidic at which time collection of the eluent began. The flow rate of the eluent was about 1 drop per second. Eluent was collected until the liquid level in the column reached the top of the resin. 100 ml of deionized water was added to the column as a wash. An additional 30 ml of eluent was collected after the initial 100 ml. The liquid was transferred to a large watchglass and placed in a vacuum desiccator for drying. The dried acid form of octylsulfonic acid was used to treat $TiO_2$ as described below.

11.6 ml of a 386.4 grams $Al_2O_3$/liter solution of sodium aluminate were added to 2240 grams of fine particle chloride process $TiO_2$ in a 350 grams/liter slurry with mixing at 70° C. The slurry pH was adjusted to 7.0 using a 50% sodium hydroxide solution, and the slurry was allowed to age for 30 minutes with stirring. The aged slurry was filtered and washed three times-with 2000 ml aliquots of 80° C. deionized water. A portion of the filter cake containing 1020 grams of $TiO_2$ was diluted to 27.6% solids with water. 11.2 grams of the acid form of 1-octanesulfonic acid were added to the reslurried filter cake at 70° C. with mixing. The treated filter cake was dried in a 110° C. oven for 24 hours. The dried filter cake was forced through an 8 mesh screen and steam micronized to produce the finished pigment.

The finished pigment was incorporated into 75% and 50% $TiO_2$ containing low-density polyethylene masterbatches for dispersion and lacing evaluations. Results are given in Table 1.

Example 4

In this example, 0.90% of hexylsulfonic acid (acid form) was added to dry chloride process rutile $TiO_2$ base, which is coated with 0.20% alumina.

A column of Dowex 50W-X8 strong acid ion exchange resin that was previously rinsed with 2 M sulfuric acid was rinsed with deionized water to remove excess rinse acid. Rinsing continued until the column eluent returned to neutral pH. Excess water was drained from the column until the level of the liquid was at the level of the resin.

20 grams of the sodium salt of 1-hexane sulfonic acid were dissolved in 100 ml of deionized water and added to the ion exchange column. The column eluent was drained to waste until the pH turned acidic at which time collection of the eluent began. The flow rate of the eluent was about 1 drop per second. Eluent was collected until the liquid level in the column reached the top of the resin. 100 ml of deionized water was added to the column as a wash. An additional 30 ml of eluent was collected after the initial 100 ml. The liquid was transferred to a large watchglass and placed in a vacuum desiccator for drying. The dried acid form of hexylsulfonic acid was used to treated $TiO_2$ as described below.

9.0 grams of hexylsulfonic acid were added drop wise in a circular motion to 1000 grams of dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatches for dispersion and lacing evaluations. Results are given in Table 1.

Example 5

In this example, 0.90% of the ammonium salt of octyl sulfonic acid was added to dry chloride process rutile $TiO_2$ base, which is coated with 0.20% alumina.

A column of Dowex 50W-X8 strong acid ion exchange resin, which was previously rinsed with 2 M ammonium hydroxide was rinsed with deionized water to remove excess ammonium hydroxide. Rinsing continued until the column eluent returned to neutral pH. Excess water was drained from the column until the level of the liquid was at the level of the resin.

40 grams of the sodium salt of 1-octane sulfonic acid were dissolved in 200 ml of deionized water and added to the ion exchange column. The flow rate of the eluent was about 1 drop per second. Eluent was collected until the liquid level in the column reached the top of the resin. 100 ml of deionized water was added to the column as a wash. An additional 30 ml of eluent was collected after the initial 100 ml. The liquid was transferred to a large watchglass and placed in a vacuum desiccator at 43° C. for drying. The ammonium salt of octylsulfonic acid was analyzed as about 84% pure. The dried ammonium salt of hexylsulfonic acid was used to treat $TiO_2$ as described below.

9.0 grams of the ammonium salt of octylsulfonic acid as a 23% solution in deionized water were added drop wise in a circular motion to 1000 grams of dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% $TiO_2$ containing low-density polyethylene masterbatches for dispersion evaluation. Results are given in Table 1.

Example 6

In this example, 0.90% of the ammonium salt of octyl sulfonic acid was added to dry chloride process rutile $TiO_2$ base, which is coated with 0.20% alumina.

The ammonium salt of octylsulfonic acid was obtained from Sanwa Chemical Company and analyzed as about 97% pure. 9.0 grams of the ammonium salt of octylsulfonic acid (Sanwa Chemical) as a 23% solution in deionized water were added drop wise in a circular motion to 1000 grams of dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatches for dispersion and lacing evaluations. Results are given in Table 1.

Comparative Example 1

Rutile $TiO_2$, prepared by the chloride process, coated with hydrous alumina as described in Example 1 was treated with 0.60% by weight triethanolamine based on the weight of dry pigment.

The finished pigment was incorporated into 75% and 50% $TiO_2$ containing low-density polyethylene masterbatches for dispersion and lacing evaluations. Results are given in Table 1.

TABLE 1

|  | Dispersion (Counts/Second) | Lacing |
| --- | --- | --- |
| Example 1 | 420 | 1.6 |
| Example 2 | 337 | 1.6 |
| Example 3 | 990 | 2.2 |
| Example 4 | 670 | 1.6 |
| Example 5 | 2,380 | not measured |
| Example 6 | 1,450 | 1.7 |
| Comparative Example 1 | 13,700 | 1.4 |

The data illustrate that dispersion performance of a $TiO_2$ pigment that has been treated with an organosulfonic compound is dramatically improved over like base pigment treated with a conventional, commercially used organic treatment, triethanolamine (Comparative Example 1) while lacing performance remains in a good to onset lacing range in the worst case.

Example 7

A portion of RCL-4 was placed in a sealed vial with zinc sulfide. The vial was heated to 200° C. for 10 minutes and an aliquot of the gas phase was then analyzed by combined gas chromatography and mass spectroscopy (GC/MS). The MS results identified the presence of odoriferous components; mainly dimethyl disulfide and dimethyl trisulfide.

Example 8

The GC/MS test used in example 7 was repeated using the pigments prepared in examples 3 and 4 in place of the RCL-4. No sulfur components were detected.

Having thus described and exemplified the invention with a certain degree of particularity, it should be appreciated that the following claims are not to be so limited but are to be afforded a scope commensurate with the wording of each element of the claim and equivalents thereof.

What is claimed:

1. A pigment comprising:
   a. a pigmentary base, wherein said pigmentary base is not activated by a metal ion; and
   b. an organosulfonic compound having the formula:

$(R-SO_3)_x M^{x+}$ wherein x=1, 2, 3 or 4
   M is selected from the group consisting of hydrogen, ammonium, organoammonium ions or metal ions with a valence of +1, +2, +3 or +4, and
   R is an organic group having from 2 to 22 carbon atoms.

2. A pigment according to claim 1, wherein the pigmentary base is selected from the group consisting of titanium dioxide, kaolin, talc and mica.

3. A pigment according to claim 2, wherein the pigmentary base is titanium dioxide.

4. A pigment according to claim 1, wherein the pigmentary base is treated with a compound selected from the group consisting of polyalcohols, alkanolamines, inorganic phosphates and mixtures thereof.

5. A pigment according to claim 1, wherein the organosulfonic compound is an organo ammonium sulfonate salt.

6. A pigment according to claim 1, further comprising an inorganic oxide.

7. A pigment according to claim 6, wherein said inorganic oxide is selected from the group consisting of silicon dioxide, zirconium oxide and aluminum oxide.

8. A pigment according to claim 1, wherein R is hexyl-, octyl-, or 2-ethylhexyl-.

9. A pigment according to claim 1, wherein the organosulfonic compound is present in the amount from about 0.1 percent to about 5 percent by weight of the pigmentary base, based on the weight of the pigmentary base prior to treating the pigmentary base with the organosulfonic compound.

10. A polymer matrix comprised of a polymer and the pigment of claim 1.

11. A polymer matrix according to claim 10, wherein the polymer is polyethylene.

12. A polymer matrix according to claim 10, wherein the amount of the pigment is from about 50 percent to about 85 percent by weight of the polymer matrix, based on the weight of the polymer matrix.

13. A method for preparing a pigment, comprising: (i) filtering a slurry, said slurry comprising a pigmentary base; and (ii) combining said pigmentary base after said filtering with an organosulfonic compound, wherein said organosulfonic compound has a formula of:

$(R-SO_3)_x M^{x+}$ wherein x=1, 2, 3 or 4
M is selected from the group consisting of hydrogen, ammonium, organoammonium ions or metal ions with a valence of +1, +2, +3 or +4 and R is an organic group having from 2 to 22 carbon atoms.

14. A method according to claim 13, wherein during said combining said pigmentary base is not activated by a metal ion.

15. A method according to claim 13, wherein the pigmentary base has been treated with the organosulfonic compound prior to a drying stage.

16. A method according to claim 13, wherein the pigmentary base has been treated with the organosulfonic compound during a milling stage.

17. A method according to claim 13, wherein the pigmentary base has been treated with the organosulfonic compound when the pigmentary base is a filter cake.

18. A method according to claim 13, wherein said combining occurs at a temperature of from about 10° C. to about 270° C.

19. A method for preparing a pigment, comprising combining a dry pigmentary base and an organosulfonic compound, wherein said organosulfonic compound has a formula of:

$(R-SO_3)_x M^{x+}$ wherein x=1, 2, 3 or 4
M is selected from the group consisting of hydrogen, ammonium, organoammonium ions or metal ions with a valence of +1, +2, +3 or +4 and R is an organic group having from 2 to 22 carbon atoms.

20. A method according to claim 19, wherein the pigmentary base has been treated with the organosulfonic compound during a micronization stage.

* * * * *